United States Patent [19]

Fujii et al.

[11] Patent Number: 4,908,200

[45] Date of Patent: Mar. 13, 1990

[54] METHOD FOR PRODUCING ELASTIC GRAPHITE STRUCTURES

[75] Inventors: Masaki Fujii, Chikushino; Masanori Minohata, Izumi, both of Japan

[73] Assignee: Kao Oil Company, Limited, Tokyo, Japan

[21] Appl. No.: 214,645

[22] Filed: Jul. 1, 1988

[30] Foreign Application Priority Data

Jul. 1, 1987 [JP] Japan ................................ 62-164808

[51] Int. Cl.$^4$ ............................................ C01B 31/04
[52] U.S. Cl. .................................... 423/448; 423/445; 423/449; 208/39; 208/44
[58] Field of Search ...................... 423/445, 448, 449; 208/39, 44

[56] References Cited

U.S. PATENT DOCUMENTS

| | | |
|---|---|---|
| 2,977,299 | 3/1961 | Joseph et al. .......................... 208/39 |
| 3,302,999 | 2/1967 | Mitchell ............................... 423/448 |
| 3,552,922 | 1/1971 | Ishikawa et al. ..................... 423/448 |
| 4,225,463 | 9/1980 | Unger et al. ......................... 423/448 |
| 4,276,246 | 6/1981 | Bonzom et al. ...................... 423/448 |
| 4,277,325 | 7/1981 | Greenwood ......................... 423/448 |
| 4,414,192 | 1/1983 | Palm et al. .......................... 423/448 |

FOREIGN PATENT DOCUMENTS

| | | |
|---|---|---|
| 62-39689 | 2/1987 | Japan ..................................... 208/44 |
| 63-139011 | 6/1988 | Japan ................................... 423/448 |
| 1049520 | 10/1983 | U.S.S.R. ............................... 208/44 |

*Primary Examiner*—John Doll
*Assistant Examiner*—Robert M. Kunemund
*Attorney, Agent, or Firm*—Wenderoth, Lind & Ponack

[57] ABSTRACT

A method for producing graphite structures which are of light weight and excel in elasticity from a carbonaceous material comprises in succession the steps of: (a) treating said carbonaceous material with nitric acid or a nitric-sulfuric acid mixture, (b) bringing the acid-treated carbonaceous material into contact with a basic aqueous solution to make it soluble, (c) adding an acidic aqueous solution to the obtained soluble matter to regulate the pH of said soluble matter to 3 or less, thereby precipitating a carbonaceous component therefrom, and (d) graphitizing the thus precipitated carbonaceous component at 2,400° C. or higher temperature.

4 Claims, 2 Drawing Sheets

100μm

1μm

↤ 10μm ↦

↤ 100μm ↦

METHOD FOR PRODUCING ELASTIC GRAPHITE STRUCTURES

BACKGROUND OF THE INVENTION

The present invention relates to a method for producing graphite structures which are of light weight and have improved elasticity.

Generally available carbon materials, whether carbonaceous or graphitic, are characterized in that they are of a rigid structure and possess high elasticity (Young's modulus). Light-weight carbon materials, on the other hand, include carbon foams, hollow carbon spheres and expandable graphite.

Carbon foams have been produced either by foaming, curing and calcining polyurethane or phenol resins or by forming and calcining hollow carbon spheres with the aid of a binder. Such foams are found to have a bulk density of the order of about 0.5 g/cm$^3$, but their graphitized structures have poor flexibility and are thus rigid.

Hollow carbon spheres have been produced by melting and atomizing foamer-containing pitches in the spherical form, which are then calcinated (see Amagi, "Materials", Vol. 16, page 315, 1971). Such spheres are relatively light-weight materials, as expressed in terms of bulk density of 0.1 to 0.3 g/cm$^3$, but are rigid for lack of flexibility.

Expandable graphite has generally been made by oxidation and heat-treatment of naturally occurring scaly graphite. This graphite is as light in weight as expressed in terms of its coefficient of expansion which may reach a factor of several hundreds, but may be subjected to compression molding, as will be appreciated from the fact that it is usable as the starting material for graphite sheets. Graphite sheets obtainable from such expandable graphite are flexible and possess elasticity to such an extent that they are restorable to their original form after a compression load has been applied thereto and removed therefrom. For this reason, they are said to excel in air-tightness when used as packing materials. However, such sheets are of a densified structure and are not satisfactory whatsoever on the point of recovery.

We have found that graphite structures of light weight and excelling in elasticity are obtainable by treating a carbonaceous material with nitric acid or a nitric-sulfuric acid mixture and graphitizing the thus treated material at a temperature of 2,400° C. or higher, and have proposed a method for making graphite structures on the basis of such findings (Japanese Patent Application No. 285493/1986). Although such graphite structures excel in elasticity, yet they are not necessarily satisfactory in terms of recovery relative to compressibility.

As a result of extensive study made so as to obtain elastic graphite structures having improved recovery relative to compressibility, we have found that elastic graphite structures of markedly improved recovery relative to compressibility can be prepared by using as the graphite structural material a modified carbonaceous material which is obtained by treating a carbonaceous material with nitric acid or a nitric-sulfuric acid mixture, then bringing the thus treated material into contact with a basic aqueous solution to make it soluble, and finally adjusting the pH of the obtained soluble matter, thereby precipitating a carbonaceous component. Thus, we have successfully accomplished the present invention.

SUMMARY OF THE INVENTION

An object of the present invention, which has been accomplished on the basis of the foregoing findings, is to provide a method for preparing graphite structures which are of light weight and excel in elasticity.

In order to achieve this object, the method for preparing elastic graphite structures from a carbonaceous material according to the present invention is characterized by the successive steps of: (a) treating the carbonaceous material with nitric acid or a nitric-sulfuric acid mixture; (b) bringing the thus acid treated material into contact with a basic aqueous solution to make it soluble; (c) adding an acidic aqueous solution to the obtained soluble matter to adjust its pH to 3 or less, thereby precipitating a carbonaceous component from said soluble matter; and (d) graphitizing the thus precipitated carbonaceous component at 2,400° C. or higher temperature.

BRIEF DESCRIPTION OF THE ILLUSTRATIONS

In the illustrations:

FIGS. 1 and 2 are photomicrographs illustrating the textures of the graphite structures obtained according to the method of the present invention; and FIGS. 3 and 4 are photomicrographs illustrating the textures of the graphite structures obtained according to the prior art method.

DETAILED DESCRIPTION OF THE INVENTION

Figure 1:

The present invention will now be described in detail with reference to examples.

Carbonaceous Material

The carbonaceous materials used as the raw materials for the graphite structures of the instant invention are preferably of carbonaceous mesophases prepared by the heat treatment of pitches that are heavy bituminous materials and/or green coke. As the raw materials for such carbonaceous materials, use may be made of any kind of pitches which produce the graphitizable carbon. Examples are coal tar pitch, coal base pitch such as liquefied coal pitch, naphtha tar pitch produced as a by-product during the thermal cracking of distillate residues of petroleum, and naphtha petrolic pitch such as, for instance, FCC decant oil produced as a by-product in the fluid catalytic cracking (FCC) process of naphtha, etc. and pitch obtained from the thermal cracking of synthetic high molecules, e.g., PVC, and the like. These pitches are heat-treated at about 350° to 500° C., thereby forming carbonaceous mesophases (including green coke). The formation of carbonaceous mesophases is easily ascertainable by the observation of the heat-treated products under a polarized-light microscope. In other words, the carbonaceous mesophase is identified as optically anisotropic texture in the pitch that is optically isotropic one. In view of the morphology of carbonaceous mesophase, it is required at this time that the heat treatment proceed through its gentle stage, i.e., the early stage of the process of carbonization where single mesophase-spheres are formed to so-called bulk mesophase wherein such spheres grow and coalesce with each other.

The heat-treatment conditions for the formation of carbonaceous mesophase are determined according to the elemental analysis of carbonaceous mesophase separated from heat-treated pitches. The conditions should preferably be such that, among the elements, hydrogen in particular is present in an amount of 2% by weight or more. The reason is that this takes part in the succeeding treatment with a sulfuric-nitric acid mixture, i.e., the amount of the nitro group introduced in the aromatic nucleus substitution reaction.

The separation of carbonaceous mesophase from the heat-treated pitches is carried out by precipitation or/and solvent fractionation. More specifically, upon being allowed to stand in a molten state, the heat-treated pitches settle down and can be collected. When the heat-treated pitches are dissolved and dispersed in a solvent such as an organic solvent, e.g., quinoline or pyridine, or an aromatic oil containing much aromatic compounds, e.g., anthracene or creosote oil, they can be obtained as components insoluble in such solvents.

Acid Treatment

The carbonaceous materials are treated with nitric acid or a sulfuric-nitric acid mixture. Both sulfuric and nitric acids are preferably used in high concentrations; at least 95% for sulfuric acid and at least 60% for nitric acid. However, neither fuming sulfuric acid nor fuming nitric acid are necessary. More preferable results are obtained with the use of a nitric-sulfuric acid mixture, rather than nitric acid alone. When used, the acid mixture is preferably such that the sulfuric and nitric acids be in a volume ratio ranging from 30:70 to 0:100. It is to be noted, however, that the optimum mixing volume ratio ranges from 30:70 to 70:30. Hereinafter, the sulfuric-nitric acid mixture is simply referred to as the acid mixture.

The carbonaceous materials are added into nitric acid or the acid mixture, and are agitated, or allowed to stand, at a temperature ranging from 0° to 150° C. for 5 minutes to 5 hours. The reaction temperature and time are determined according to the yield of the carbonaceous component obtained in the precipitation step by way of the solubilization step. In general, the lower the temperature the longer the time will be, while the higher the temperature the shorter the time will be.

After the treatment, the product is washed well with water and dried. It is to be noted, however, that for the purpose of simplifying the steps, the acid-treated product may be used in the next step as it is, immediately after filtration.

Solubilization Step

A basic aqueous solution is added to the acid-treated carbonaceous material until a certain pH is reached, thereby obtaining a soluble matter. In this case, the term "soluble matter" can be taken to refer to a matter that passes through a membrane filter (0.1 μm)

The basic aqueous solution used in this case may be either an aqueous solution of an alkaline metal or aqueous ammonia. The pH to be adjusted is determined according to the acid-treating conditions applied in the aforesaid acid-treatment step, and the higher the pH the greater is the amount of the soluble matter. However, the pH has no influence upon the nature of the graphite structures to be obtained in the later steps.

Precipitation of Carbonaceous Component

An acidic aqueous solution such as an aqueous solution of hydrochloric acid is added to the soluble matter obtained in the solubilization step to adjust the pH of the soluble matter to 3 or less, preferably 1 or less, whereby the carbonaceous material solubilized in the solubilization step is precipitated as a carbonaceous component (which hereinafter shall be referred to as the aqua-mesophase). A pH value exceeding 3 is not desirable since the solubilized carbonaceous material remains in the solution due to insufficient precipitation of the aqua-mesophase.

Subsequently, the aqua-mesophase obtained as above is filtered through, e.g., a glass filter (No.4), and is dried.

Graphitization Step

The aqua-mesophase obtained as described above is heat-treated at a temperature of 250° to 300° C. This treatment causes the volume of the carbonaceous materials to increase several times to several tens of times. The rate of volume increase at this time is considered to be related to the acid treatment conditions or the type and pH of the base used for the preparation of the aqua-mesophase. Among the heating conditions in said temperature range, the heating rate, whether high or low, has little or no influence upon the rate of volume increase. This is because the decomposition of carbonaceous materials occurs in a narrow temperature region in the vicinity of approximately 250° C. Hence, this treatment is not necessarily carried out in the form of a separate step. This means that, unless any handling problem arises due to the increase in volume, the heat treatment may be followed immediately by graphitization.

The aqua-mesophase, whether heat-treated as above or not, is heated to a temperature of 2,400° C. or higher for graphitization.

If the graphitization temperature is lower than 2,400° C., a graphite structure having the desired properties is not then obtained since both its compressibility and recovery decrease, although its weight is light. The higher the temperature, the more flexible it will be; however, a graphitization temperature of 3,000° C. or lower is preferable in view of economical consideration.

This treatment makes it possible to produce graphite structures which are light in weight and excel in elasticity. The thus produced graphite structure is of light weight, as expressed in terms of its packing density of at most 0.5 g/cm$^3$. When put in a cylindrical vessel and caused to receive a load from above, this graphite structure is compressed. At this time, the compressibility is proportional to the load applied. In the case of the graphite structures of the present invention, even when a very large compressibility of as high as 95% is applied, a recovery of 80% or higher is obtained after the removal of the load. A load corresponding to a compressibility of 95% or higher is 5,500 kg/cm$^2$ or higher. Even though a load of 9,300 kg/cm$^2$ is applied, a recovery of 80% or higher is obtained.

Although not sufficiently elucidated, the reason why the elastic graphite structures according to the present invention show considerably improved recovery relative to compressibility may be presumed to be as follows.

As mentioned above, the acid-treated carbonaceous material obtained in the acid-treatment step is once solubilized in a basic aqueous solution to disorder the molecular arrangement thereof, and the pH of the solution is then regulated to precipitate the aqua-mesophase, whereby the aqua-mesophase is ridded of the crystallinity of the carbonaceous mesophase that is the starting carbonaceous material, and is thus modified to an amorphous carbon material. Upon being heat-treated or graphitized, this amorphous carbon material forms a graphite particle where a number of cellular structures comprising thin carbon layer planes are isotropically formed. The properties, which arise from the facts that such a graphite particle is of cellular structures and a number of cellular structures comprising thin carbon layer planes are isotropically formed, are presumed to have a synergistic effect upon improvements in elastic properties.

In the graphite structures which have not been subjected to the treatment for forming the aqua-mesophase (i.e., subjected to the acid treatment alone), thin carbon layer planes are formed, but any cellular structures are not. This is presumed to be the reason why such graphite structures are poorer in elastic properties than the elastic graphite structures of the present invention.

Examples of the present invention are presented below. However, it is to be understood that the present invention is by no means limited to the description of such examples.

EXAMPLE 1

Two (2) kg of an FCC decanted oil, from which low-boiling components having boiling points of not higher than about 500° C. had previously been removed by distillation under reduced pressure, was heated under agitation to 500° C. in a nitrogen gas stream in a vessel of 5-liter capacity and was held at that temperature for 2 hours. Thereafter, the heating and stirring were stopped to cool the vessel. When the internal temperature of the vessel reached 400° C., that temperature was maintained by heating. After the lapse of a total of 3 hours from the beginning of cooling, about 1.6 kg of a pitch-like product was removed from the vessel through a hole formed in the lower part thereof. About a 2-fold amount of quinoline was added to this pitch-like product, and the mixture was heated at 90° C. for dissolution and dispersion. Then the insoluble component was centrifuged and supplied with fresh quinoline, after which heating and centrifuging were carried out. After this operation had been repeated five times, the insoluble component was amply washed with benzene and acetone, and then dried. The insoluble component thus obtained in an amount of 1.2 kg was found to show over its surface an anisotropic phase of a flow texture by the observation of its texture under a polarization microscope. Therefore, this insoluble component was used as the carbonaceous mesophase.

The elemental composition of the carbonaceous mesophase prepared in this manner was:

| | |
|---|---|
| Carbon | 93.2%, |
| Hydrogen | 3.8%, and |
| Nitrogen | 0.7%. |

Six (6) g of the mesophase having a particle size of 0.35 mm or less was added in small portions to 100 ml of acid mixture consisting of 97% concentrated sulfuric acid and 70% concentrated nitric acid in a volumetric ratio of 50:50 in an Erlenmeyer flask of 300 ml in capacity. After the total amount of the mesophase had been added, the flask was heated for 1 hour in an oil bath previously heated to 100° C. Then, the product was filtered out through a glass filter (No. 4), amply washed with water and dried. The yield was 128.9% by weight.

This product was dispersed in water, and $NH_3$ was added under agitation to the obtained dispersion until a pH value of 10 was reached. Then, the dispersion was filtered out through a membrane filter (0.1 μm), and 1N HCl was added to the filtrate until a pH of 1 or less was reached. The aqua-mesophase was filtered out through a glass filter (No.4) and dried. The yields of the aqua-mesophase and insoluble matter were then respectively 122.7% by weight and 0.0% by weight with respect to the carbonaceous mesophase.

The aqua-mesophase was placed in a cylindrical glass vessel of 500 ml, and then it was held for 30 minutes in a salt bath previously heated to 300° C.

Then, the aqua-mesophase was heated to 2,800° C. at a heating rate of 400° C./min. in an argon stream and was held at that temperature for 30 minutes for graphitization. The yield was 38.8% by weight with respect to the carbonaceous mesophase.

The compression moduli (elastic modulus recovery) were then measured in the following manner. In a cylindrical vessel of 10-mm inner diameter was put 0.5 g of a graphitized sample regulated to 0.30 mm or less, on which a load of 100 g/cm² was applied from above. The volume of the sample at this time was used as the reference volume ($h_0$). A load of 1.0 kg/cm² was then applied on the sample to determine its volume ($h_1$). The load was subsequently removed from the sample to determine its volume ($h_2$). The compressibility and recovery were calculated by the following equations:

Compressibility (%) = $\{(h_0 - h_1)/h_0\} \times 100$ and

Recovery (%) = $\{(h_2 - h_1)/(h_0 - h_1)\} \times 100$.

The packing density was also found by:

Packing Density = Sample Weight ÷ 0.785 $h_0$.

The compressibility calculated in this manner was 6%, the recovery 100%, and the packing density 0.20 g/cm³. The compressibility and recovery of this sample determined under varied loads are shown under Experiment No. 1 in Table 2. Tables 1 and 2 also show the results obtained using the same starting carbonaceous mesophase as above under varied graphitization conditions, in varied volume ratios of nitric and sulfuric acids, and with the use of varied types of bases regulated to varied pH values.

Figure 2:
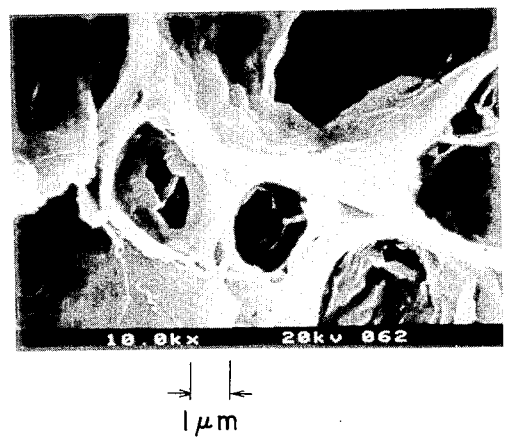

SEM (scanning electron microscope) photographs of the elastic graphite structures obtained as above are shown in FIGS. 1 and 2, from which it is found that the graphite structures obtained in the instant example are a graphite particle wherein a number of small cellular structures formed of thin carbon layer planes are isotropically formed.

EXAMPLE 2

The elemental composition of a small carbonaceous mesophase sphere obtained in a similar manner as in Example 1 was as follows.

| | |
|---|---|
| Carbon | 91.2% |
| Hydrogen | 3.3%, and |

TABLE 1

| Exp. No. | Acid Mixture Treatment Conditions | | | | Aqua-mesophase | | | Graphitization Conditions | | Packing Density (g/cm³) |
|---|---|---|---|---|---|---|---|---|---|---|
| | Volumetric Ratio Sulfuric:Nitric | Temp. (°C.) | Time (hr) | Yield (wt. %) | Base | pH | Yield (wt. %) | Temp. (°C.) | Yield (wt. %) | |
| 1 | 50:50 | 100 | 1 | 128.9 | NH₃ | 10 | 122.7 | 2800 | 38.8 | 0.20 |
| (Exam. 1) 2 | 0:100 | 150 | 5 | 85.4 | NaOH | 12 | 83.8 | " | 36.3 | 0.35 |
| 3 | 70:30 | 100 | 1 | 89.9 | " | 10 | 81.3 | " | 30.4 | 0.25 |
| (Exam. 2) 4 | 50:50 | " | " | 103.0 | " | " | 100.7 | " | 30.1 | 0.21 |
| (Exam. 3) 5 | " | " | " | 138.3 | " | " | 138.0 | " | 50.5 | 0.18 |
| (Comp. Example) 6 | " | " | " | " | — | — | — | " | 45.4 | 0.10 |

Nitrogen 0.8%.

Six (6) g of the mesophase product, which had been pulverized to a particle size of 0.35 mm or less, was treated in the acid mixture in a similar manner as described in Example 1, amply washed with water, and dried. This was dispersed in water, and an aqueous solution of 1N NaOH was added under agitation to the dispersion until a pH value of 10 was reached. An insoluble matter was filtered out through a membrane filter (0.1 μm), and 1N HCl was added to the filtrate until a pH value of 2 or less was reached. The precipitated aqua-mesophase was filtered out through a glass filter (No. 4) and then dried. The dried product was then treated at 300° C. for 30 minutes, heated to 2,800° C. in a Tammann furnace, and was held therein for 30 minutes for graphitization. The results are set out under Experiment No. 4 in Table 1. The compressibility and recovery, as measured, of the thus obtained graphite structure are also set out under Experiment No. 4 in Table 3.

EXAMPLE 3

Green coke obtained by the delayed coker process was pulverized to a particle size of 0.35 mm or less with the elemental composition of carbon: 91.8%, hydrogen: 3.6%, and nitrogen: 1.4%. Six (6) g of the pulverized product was treated in the mixed acid in a similar manner as described in Example 1, washed well with water and dried. The yield was 138.3% by weight. 1N NaOH was added under agitation to this until a pH value of 10 was reached. The product was filtered through a membrane filter (0.1 μm) to remove an insoluble matter, and 1N HCl was added to the filtrate until a pH value of 2 was reached. The precipitated aqua-mesophase was filtered out and dried. Subsequently, that phase was heat-treated and graphitized in a similar manner as described in Example 1. The results are shown under Experiment No. 5 in Table 1. The compressibility and recovery, as measured, of the obtained graphite structure are also shown under Experiment No. 5 in Table 3.

Comparative Example

The acid-treated product obtained in Example 3 was heat-treated and graphitized as described in Example 1. The results are shown under Experiment No. 6 in Table 1. The compressibility and recovery, as measured, of the obtained graphite structure are also shown in Table 4.

Figure 3:
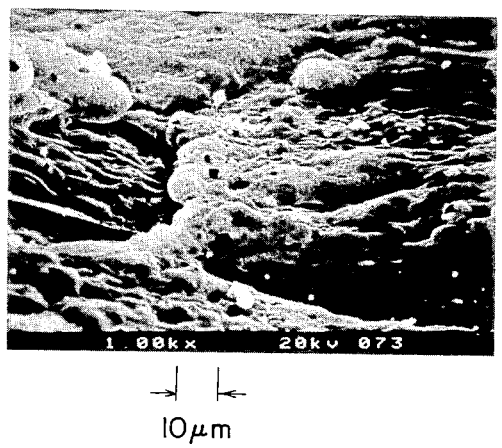
Figure 4:
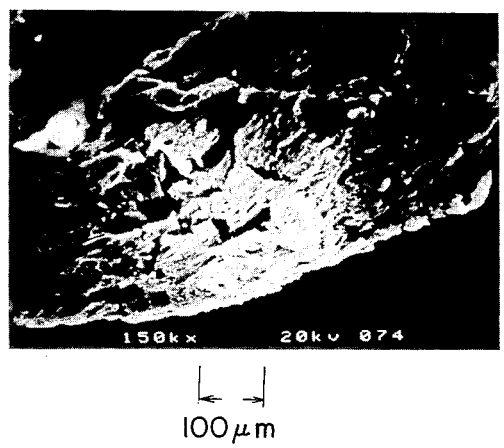

SEM (scanning electron microscope) photographs of the graphite structures obtained in this comparative example are shown in FIGS. 3 and 4, from which it is found that they are different from those obtained in the examples of the present invention, i.e., are not cellular in structure.

TABLE 2

| Exp. Nos. | Load (kg/cm²) | Compressibility (%) | Recovery (%) |
|---|---|---|---|
| 1 | 1 | 6 | 100 |
| | 5 | 18 | 100 |
| | 10 | 24 | 88 |
| | 50 | 47 | 88 |
| | 500 | 92 | 80 |
| | 1500 | 93 | 80 |
| | 5500 | 95 | 80 |
| | 9300 | 96 | 80 |
| 2 | 1 | 3 | 100 |
| | 5 | 9 | 100 |
| | 10 | 13 | 90 |
| | 50 | 33 | 90 |
| | 500 | 76 | 87 |
| | 1500 | 82 | 87 |
| | 9300 | 85 | 86 |
| 3 | 1 | 4 | 100 |
| | 5 | 14 | 100 |
| | 10 | 18 | 90 |
| | 50 | 44 | 88 |
| | 500 | 84 | 86 |
| | 1500 | 86 | 85 |
| | 9300 | 89 | 85 |

TABLE 3

| Exp. Nos. | Load (kg/cm²) | Compressibility (%) | Recovery (%) |
|---|---|---|---|
| 4 | 1 | 4 | 100 |
| | 5 | 12 | 100 |
| | 10 | 20 | 88 |
| | 50 | 46 | 88 |
| | 500 | 89 | 87 |
| | 1500 | 93 | 87 |
| | 5500 | 94 | 85 |
| | 9300 | 95 | 85 |
| 5 | 1 | 6 | 100 |
| | 5 | 9 | 100 |
| | 10 | 18 | 100 |
| | 50 | 48 | 94 |
| | 500 | 89 | 94 |
| | 1500 | 93 | 91 |
| | 5500 | 95 | 91 |
| | 9300 | 96 | 84 |

TABLE 4

| Exp. Nos. | Load (kg/cm²) | Compressibility (%) | Recovery (%) |
|---|---|---|---|
| 6 | 1 | 8 | 90 |
| | 5 | 26 | 62 |
| | 10 | 43 | 55 |
| | 50 | 83 | 50 |
| | 500 | 90 | 48 |
| | 1500 | 92 | 45 |
| | 5500 | 94 | 34 |
| | 9300 | 95 | 18 |

What is claimed is:

1. A method for producing graphite structures from a carbonaceous material, which comprises in succession the steps of:
    (a) treating said carbonaceous material with nitric acid or a nitric-sulfuric acid mixture;
    (b) bringing the acid-treated carbonaceous material into contact with a basic aqueous solution to make it soluble;
    (c) adding an acidic aqueous solution to the obtained soluble matter to regulate the pH of said soluble matter to 3 or less, thereby precipitating a carbonaceous component therefrom; and
    (d) graphitizing the thus precipitated carbonaceous component at 2,400° C. or higher temperature.

2. A method as recited in claim 1 wherein said structures have a packing density of 0.5 g/cm$^3$ or less, and show a recovery of 80% or higher at a compressibility of 95%.

3. A method as recited in claim 1 wherein said carbonaceous material comprises a carbonaceous mesophase and/or coke having a hydrogen content of 2% by weight or higher.

4. A method as recited in claim 1 wherein said step (a) is carried out at a temperature of 0° to 150° C. for 5 minutes to 5 hours in a sulfuric-nitric acid mixture in a mixing volume ratio of 70:30 to 0:100.

* * * * *